Patented July 10, 1945

2,380,247

UNITED STATES PATENT OFFICE 2,380,247

TRINITROTOLUENE

Christian Elmer Olsen, Washburn, Wis., assignor to E. I. du Pont de Nemours & Company, Wilmington, Del., a corporation of Delaware No Drawing. Application November 2, 1940,
Serial No. 364,031

4 Claims. (Cl. 260—645)

This invention relates to the manufacture of trinitrotoluene. It is an improvement over the process described in copending application Serial No. 312,354, filed January 4, 1940.

The object of the invention is a new and improved method for producing trinitrotoluene. A further object is the production of crystalline trinitrotoluene substantially free from pellets. Another object is the production of crude trinitrotoluene in a form which can be purified readily and safely. An additional object is the formation of trinitrotoluene in a crystalline form which will permit the facile separation of the solution therefrom. Further objects will be appreciated from the following detailed description of my invention.

The following objects are accomplished by the process of my invention which comprises forming a mixture of the molten crude trinitrotoluene with water, agitating and cooling gradually to approximately 70.5° C. by the gradual addition of cold water. With the beginning of crystallization at this point, the temperature is permitted to rise to about 72.5° C. Gradual cooling with added water is continued. The trinitrotoluene separates as fine needle-like crystals which soon form into suspended agglomerates of said crystals. At about 71.5° C., crystallization is completed quickly by cooling sharply to about 67° C. The addition of cooling water is then stopped and a sodium sulfite refining solution is added with agitation. This causes the agglomerates to disintegrate to yield a substantially pellet-free slurry of individual crystals of a high degree of purity.

The invention may be appreciated more readily from the following example which constitutes a preferred embodiment thereof:

Example

An emulsion or intimate mixture of 3400 pounds of crude trinitrotoluene having a freezing point of 77.5° C. and 200 gallons of hot water is agitated vigorously by mechanical means, the temperature of said mixture being 81.5° C. While continuing the agitation, cold water at a temperature of 15° C. is added to the mixture, said water being drizzled onto the charge surface at two points. This initial cooling is sufficiently rapid to lower the charge temperature to 70.5° C., at which temperature crystallization begins, in about two minutes. At this point, the liberated heat of crystallization causes a rapid rise in charge temperature to a maximum of about 72.5° C., after which the temperature falls slowly as crystallization progresses and the slow addition of cooling water is continued.

During this crystallizing period, the trinitrotoluene is seen to separate gradually from the water to form suspended agglomerates of crystalline trinitrotoluene. This separation is allowed to proceed almost to completion, which stage is reached about seven minutes after crystallization began, the charge temperature having fallen to about 71.5° C. At this point, crystallization is completed quickly and the crystal agglomerates are cooled sharply by suddenly increasing the rate of cold water introduction so as to drop the temperature of the violently agitated charge to about 67° C. in about two minutes. As soon as this chilling has been effected, the introduction of cold water is stopped, and the 160 gallons of refining solution (16–17% $Na_2SO_3$, at 32–38° C.) are added. At this point, the trinitrotoluene, that is the symmetrical 2, 4, 6 isomer has solidified completely, and is largely in the form of small pea-sized agglomerates of the coarse needle-shaped crystals finally obtained. The material remaining molten now consists largely of the impurities. The heat of reaction and residual heat combine to cause the charge temperature to rise to about 71.5° C. during the 10-minute refining treatment given the slurry prior to pumping it from the tank to the dewatering means. It is during this agitated refining treatment that the aggregates disintegrate to yield a slurry of separated individual crystals which is practically pellet-free (less than 0.1% of pellets). The final charge volume of 880 gallons indicates that 230 gallons of cold water were introduced as coolant during the crystallization process, distributed as follows:

| | Gallons |
|---|---|
| From start, to crystallizing-point | 80 |
| During crystallization period | 50 |
| Chilling water | 100 |
| Total added | 230 |

The outstanding advantages of my invention include the remarkably complete disintegration of the small pellets into individual crystals. It is believed that the unsymmetrical isomers of trinitrotoluene constitute the principal medium bonding the crystals together in pellet form. Pellet disintegration probably results from the removal of these surface isomers during refining treatment. It will be appreciated that the crystals thus formed not only possess a high degree of purity but permit facile elimination of the purifying solution. Furthermore, the invention is characterized by safety and ease of operation without entailing the use of complicated and expensive equipment.

It will be appreciated by those skilled in the art that the foregoing procedure permits of variations without departing from the spirit or scope of the invention. For instance, the process of crystallizing trinitrotoluene under water under the conditions set forth herein constitutes an excellent method for preparing the material for any type of purification treatment. The material thus crystallized is in a form which can be purified readily by any convenient method, of which many are available in addition to the sodium sulfite treatment described herein. I intend therefore to be limited only in accordance with the following claims.

I claim:

1. A method of producing substantially pure trinitrotoluene which comprises forming a mixture of the molten crude trinitrotoluene in water, agitating at approximately 81.5° C., adding cold water to cool the mixture to approximately 70.5° C. causing crystallization to commence, permitting the temperature to rise from the heat of crystallization to approximately 72.5° C., continuing the addition of cooling water to lower the temperature to approximately 71.5° C. in approximately 7 minutes, sharply cooling with added cold water to lower the temperature to about 67° C. in approximately 2 minutes causing the formation of agglomerates of fine crystals of symmetrical trinitrotoluene, adding warm sodium sulfite solution to cause a rise in temperature to approximately 71.5° C., and agitating approximately 10 minutes causing the formation of a substantially pellet-free slurry of individual crystals of substantially pure trinitrotoluene.

2. A method of producing substantially pure trinitrotoluene, which comprises forming a mixture of molten crude trinitrotoluene and water, cooling said mixture to effect gradual crystallization, introducing a sodium sulfite solution into the slurry of crystals, and washing said crystals with said sodium sulfite solution while the mass is at a temperature between approximately 67° and 71.5° C.

3. A method of producing substantially pure trinitrotoluene, which comprises forming a mixture of molten crude trinitrotoluene and water, cooling said mixture to effect gradual crystallization of the trinitrotoluene, introducing a sodium sulfite solution into the slurry of crystals, thereby raising the temperature of the charge by reason of the heat of reaction and washing the substantially completely crystallized symmetrical trinitrotoluene free from the unsymmetrical isomers at approximately 67° to 71.5° C.

4. A method of producing substantially pure trinitrotoluene, which comprises adding to crude molten trinitrotoluene, cooling water having a temperature appreciably below the solidification temperature of said crude trinitrotoluene to effect crystallization of the trinitrotoluene, and washing the crystals with an alkaline sulfite solution while the mass is at a temperature between approximately 67° and 71.5° C.

CHRISTIAN ELMER OLSEN.